(12) United States Patent
Kristensen (10) Patent No.: US 8,669,756 B2
(45) Date of Patent: Mar. 11, 2014

(54) TEST APPARATUS FOR A BROADBAND TELECOMMUNICATION NETWORK

(75) Inventor: Marinus Kristensen, Struer (DK)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 477 days.

(21) Appl. No.: 12/919,534

(22) PCT Filed: Feb. 29, 2008

(86) PCT No.: PCT/SE2008/050232
§ 371 (c)(1),
(2), (4) Date: Aug. 26, 2010

(87) PCT Pub. No.: WO2009/108095
PCT Pub. Date: Sep. 3, 2009

(65) Prior Publication Data
US 2010/0327852 A1 Dec. 30, 2010

(51) Int. Cl.
*G01R 19/00* (2006.01)
*G01R 15/18* (2006.01)

(52) U.S. Cl.
USPC ........................................ 324/76.11; 324/127

(58) Field of Classification Search
None
See application file for complete search history.

(56) References Cited

U.S. PATENT DOCUMENTS

| | | | | |
|---|---|---|---|---|
| 4,679,132 | A | * | 7/1987 | Jirka .......................... 363/21.13 |
| 5,570,278 | A | * | 10/1996 | Cross ............................... 363/20 |
| 5,956,245 | A | * | 9/1999 | Rozman ........................... 363/89 |
| 6,686,929 | B2 | * | 2/2004 | Bang .............................. 345/698 |
| 7,092,691 | B2 | * | 8/2006 | Bohn et al. .................... 455/280 |
| 7,629,852 | B2 | * | 12/2009 | Floyd et al. ................... 330/305 |

* cited by examiner

*Primary Examiner* — Vinh Nguyen (57) ABSTRACT

A test apparatus for a broadband telecommunication network. The apparatus includes a DC power source having a first electrical terminal and a second electrical terminal and a DC feeding bridge having a pair of inputs coupled to the first and second electrical terminals of the DC power source. The first electrical circuit having at least one circuit section having a transformer-coupled impedance formed by at least one transformer connected in parallel to a first impedance, and a pair of outputs that are adapted for establishing electrical contact with a device under test (DUT) configured to be disposed on a pair of transmission lines of the broadband telecommunication network.

11 Claims, 6 Drawing Sheets

TEST APPARATUS FOR A BROADBAND TELECOMMUNICATION NETWORK

TECHNICAL FIELD

The present invention relates generally to test apparatuses for telecommunication networks.

BACKGROUND

In the early days of telecommunication systems were relative simple compared to telecommunications today. A central office or telephone exchange was connected via 2-wire connection to telephone terminals. When a person wished to place a telephone call from one telephone terminal to another telephone terminal, a connection was established between the two terminals via the telephone exchange. Only AC signals, i.e. speech signals, were transmitted between the two terminals. A DC power source was connected directly to respective telephone terminals, usually this power source was a battery. The DC source is needed to get the telephones active. Ringing voltage for the bell was transmitted between the subscribers and the Central Office.

Later on the DC power source was moved from the individual telephone terminals to the network, e.g. central office or telephone exchange. A Battery Feeding DC Voltage, ($V_{BAT}$ at app. −48 Volts) was introduced at the 2-wire subscriber line by the exchange, placed at the central office. This new DC voltage at the 2-wire subscriber line replaced the batteries at the subscribers, and introduced new signaling possibilities. The possibilities included automatically on-hook and off-hook detection and automatic dial-pulse detection.

The injection of the DC on the 2-wire subscriber line was done in a way without damaging or corrupting the AC-signals, i.e. the speech signals, and most frequently by using Feeding Coils. Later on, other solutions were introduced, e.g. silicon solutions.

Increase in number of telephone terminals and connections have made the systems more complex as well as requiring more complex methods and apparatuses for testing connections. A DC-Feeding Bridge, also known as a DC-source, and a Holding Circuit, also known as a DC-load, are both suitable tools during transmission validation tests. A Holding Circuit is essentially the opposite of a DC-Feeding Bridge. Validation tests are typical carried out to document that a unit is compliant with a given specification.

A DC-Feeding Bridge is a common name for a circuit which is able to introduce a DC voltage on an analogue subscriber line or circuit without any significant degradation in the AC condition or performance of transmission line properties. For examples of using DC-Feeding Bridge and Holding Circuit during validation tests please refer to ETSI TR 101 953-1-1 section 6.3 and ITU-T G.992.3 section A.4.3.3.1.

A DC-Feeding Bridge which fulfils the guidelines or requirements given in ETSI TR 101 953-1-1 section 5 is not easy to design and realize. As mentioned in ITU-T G.992.3 section A.4.3.3.1, specific part of the report follows here, quote in italics:

The inductors and capacitors included in the set up need to be matched so as not to affect the results. When larger ratios of the impedance of the inductors and capacitors to the 50Ω resistors are used, less matching is required in these devices. Inductor matching is typically easier to achieve if a bifilar winding on a single core is used to create the matched pair. Adequate care should be taken to insure no resonance occurs within the measurement frequency range. This may require the use of two inductors in series (of different size) to meet this requirement when the measurement is broadband. It is also important to ensure that in tests that have DC current flowing, no saturation occurs in the inductors. It should also be noted that some types of capacitors vary in value with applied voltage, in general high quality plastic types should be suitable.

Resonance is more or less inevitable because the traditional implementation of a DC-Feeding Bridge requires two, or often more, inductors in series to achieve satisfactory results concerning impedance and bandwidth, to carry out ADSL2 broadband measurements. ITU-T G.992.3 deals with ADSL2, bandwidth 26 kHz to 1.1 MHz.

The problem increases with ADSL2+, bandwidth 26 kHz to 2.2 MHz, but the problem becomes enormous with the introduction of 6-band VDSL2, bandwidth 26 kHz to 30 MHz, because more inductors are needed.

One solution could be to divide the broadband measurements into two or even more different frequency bands, but both test time and complexity is contemplated to increase dramatically; this is, however, still the most common way to carry out the broadband measurements.

SUMMARY

The present invention provides a test apparatus which avoids resonances when elements are used in series, further it is possible to realize a DC-Feeding Bridge suitable for both POTS, plain old telephone service, and broadband measurements.

Still further the present invention provides a simple and new way of implementing a DC-Feeding Bridge and a Holding Circuit which is suitable for the ETSI/ITU specified test-setup for broadband measurements e.g. during 6 band VDSL2 isolation validation tests—between DSL and POTS.

It is an object of the present invention to provide a test apparatus that at least work in the frequency range of 100 Hz to 30 MHz. The specific frequency area or range may be varied according to specific requirements in various telecommunications standards, such as ITU-T G.992.3 and ETSI TR 101 953-1-1, and succeeding standards.

This object, along with other numerous objects and advantages is achieved with a test apparatus for use with a broadband telecommunication network. The test apparatus according to the present invention comprises an electrical DC power source having a first electrical connection and a second electrical connection.

The test apparatus further comprises a first electrical circuit comprising a first electrical circuit input and a second electrical circuit input and a first electrical circuit output and a second electrical circuit output. The first and second electrical circuit input electrically connected to the first electrical connection of the electrical DC power source and the second electrical connection of the electrical DC power source respectively.

In the apparatus electrical connection is established from the first electrical circuit input to the first electrical circuit output via a first inductor having a first inductance. Further an electrical connection being established from the second electrical circuit input to the second electrical circuit output via a second inductor having a second inductance. Additionally a first impedance is transformer coupled to the first inductor.

The apparatus still further comprises a first test apparatus outlet electrically connected to the first electrical circuit outlet and a second test apparatus outlet electrically connected to the second electrical circuit outlet. The first test apparatus outlet and the second test apparatus outlet adapted for establishing electrical contact to a device to be tested.

Advantageously the circuit produce an advantageous frequency profile that is considerable more smooth compared to previous circuits used for DC holding circuits and DC feeding bridges.

The above mentioned elements may advantageously be assembled in a housing or box. The power source may be included in the housing, alternatively be connected thereto. The power source may include a transformer. In some embodiments the power source may be a DC power source.

A person designing a test apparatus according to the present invention may choose particular component characteristics dependent on the desired use of the apparatus. One specific example of an embodiment will be given in relation to the description of FIG. 8 below.

Advantageously the circuit may comprise shared electrical components, e.g. a common inductor being part of a transformer with three inductors, as will be described in more detail with reference to the appended illustrations.

In some embodiments of the present invention first inductance may be substantially equal to the second inductance. Matching of the inductances may in some embodiments provide advantageous frequency profiles or responses.

In a first embodiment of a circuit of the test apparatus according to present invention the first impedance is transformer coupled to the second inductor. In a second embodiment of a circuit of the test apparatus according to present invention a second impedance is transformer coupled to the second inductor. The first embodiment is contemplated to reduce the number of components in the circuit, but other considerations may require that the second embodiment is preferred.

The inductors mentioned throughout the present specification are construed to encompass both coils and solenoids. Also, the impedance may be constituted by suitable electrical components including a resistor, a variable resistor, a capacitor, an inductor or any combinations thereof. The variable resistors may be constituted by rheostats, potentiometers, presets and the like.

In a particular advantageous embodiment of the present invention the test apparatus may include a second electrical circuit comprising a third electrical circuit input and a fourth electrical circuit input and a third electrical circuit output and a fourth electrical circuit output, the third and fourth electrical circuit input electrically connected to the first electrical circuit output and second electrical circuit output, respectively, electrical connection being established from the third electrical circuit input to the third electrical circuit output via a third inductor having a third inductance, electrical connection being established from the fourth electrical circuit input to the fourth electrical circuit output via a fourth inductor having a fourth inductance, a third impedance being transformer coupled to the third inductor.

It is contemplated that multiple circuits may be used for achieving desired frequency responses or profiles. The circuits may be implemented on interchangeable circuits boards or the like, which may be advantageous in the event that a plurality of circuit boards are available to change the frequency profile or response after the test apparatus has been produced, e.g. if it is desired to change the frequency profile or response during testing. The different circuit boards could then include electrical components having different characteristics. The circuits should have the same type of components, arranged in the same manner, as the first and second circuits mentioned above.

Specific embodiments of the present invention include embodiments where one or more of the inductors are constituted by a coil or a solenoid. The specific choice of element may depend on the actual implementation and intended use.

Embodiments of the present invention provides for the transformer coupling between the first inductor and the first impedance being established using a bifilar arrangement, as a transformer with an air core or an iron core or any combinations thereof. The specific choice of implementation may depend on factors such as component availability, cost, reliability etc.

DETAILED DESCRIPTION

Figure 1:
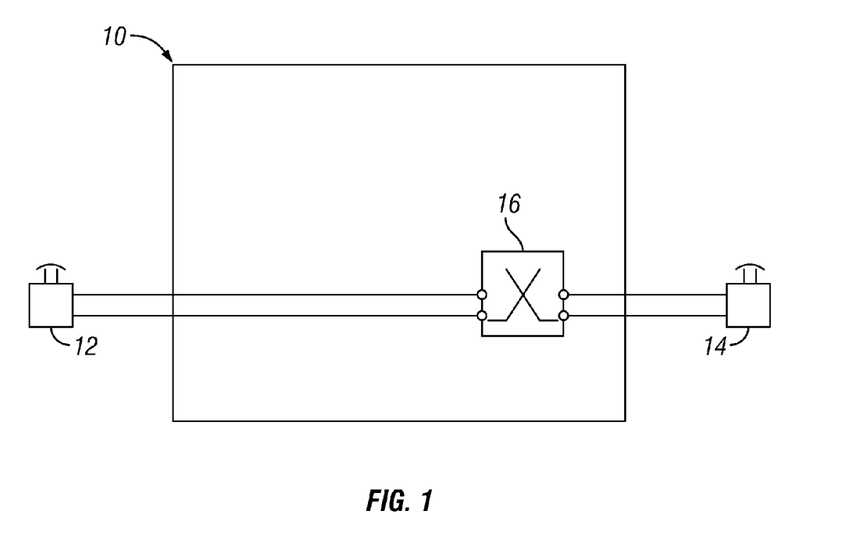
FIG. 1 is a schematic illustration of a simple, prior art, old-fashion telephone exchange.

FIG. 1 is a schematic illustration of a simple, old-fashion telephone central or central office 10, where connection between two telephone terminals 12, 14 is established.

An exchange unit 16 is provided. The unit 16 may establish contact or a path of communication from one terminal to another. The two terminals may be any two terminals of a plurality of terminals, not shown. Each of the terminals 12, 14 include a power source in the form of a battery. When a connection is to be established, i.e. a person wishes to place a call from one telephone to a person at another telephone, a signal is sent from the terminal 12 to the exchange 16 so that a new connection may be established to the terminal 14. Speech signal was transmitted from the telephone terminals as AC signals.

Figure 2:
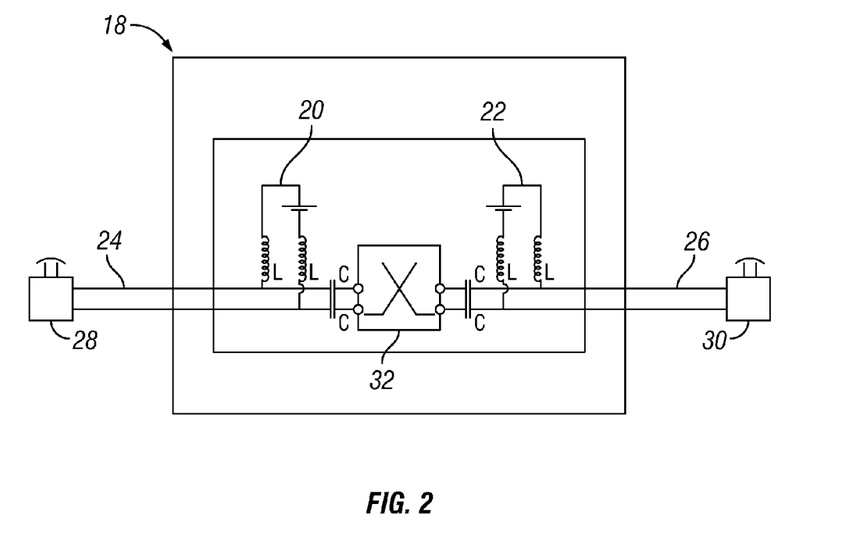
FIG. 2 is a schematic illustration of a second, prior art, telephone exchange.

FIG. 2 is a schematic view of a second telephone central or central office 18. In contrast to the central 10 in FIG. 1 the central 18 includes battery source 20, 22. The batteries 20, 22 are coupled to respective lines 24, 26 for supplying electrical power to telephone terminals 28, 30. A switching part 32 established contact between telephone terminals when a call is placed. The establishment of power supply at the central 18 allowed new signaling possibilities e.g. automatically on hook and off hook detection and automatically dial pulse detection.

The electrical power supplied from the central 18 is supplied as a DC signal, which is introduced to the lines without corrupting or distorting the AC speech signals. The power is supplied via feeding coils as shown in FIG. 2.

Figure 3:
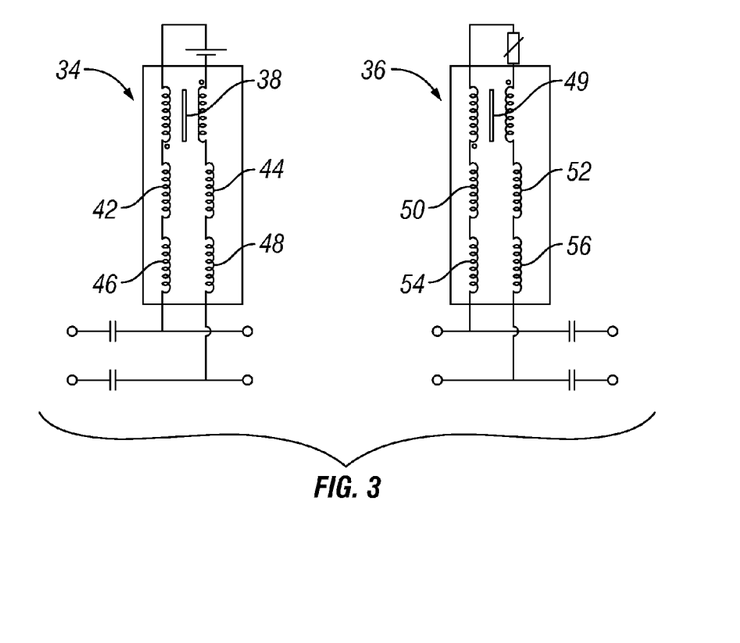
FIG. 3 is a schematic illustration of a traditional, prior art, implementation of a DC-feeding bridge and a DC-holding circuit.

FIG. 3 is a schematic illustration of a traditional, prior art, implementation of DC-Feeding Bridge 34 and DC-Holding Circuit 36.

As mentioned before, and as shown in FIG. 3, the traditional implementation of a DC-Feeding Bridge 34 and DC-Holding Circuit 36 are done by transformers 38, 49 and/or coils 42, 44, 46, 48, 50, 52, 54, 56 in series. The coil pairs 42 and 44 etc. have to be matched or made as bifilar winding transformers as 38 and 49. A bifilar winding or bifilar coil is an electromagnetic coil that contains two closely spaced, parallel windings.

Figure 4:
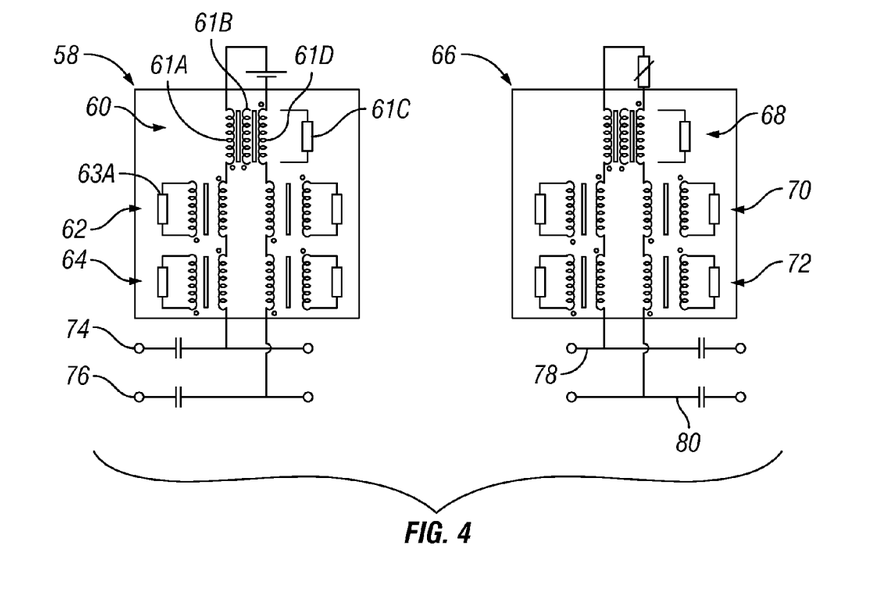
FIG. 4 is a schematic illustration of a block diagram of a DC-feeding bridge and a DC-holding circuit.

FIG. 4 schematically illustrates an example of an implementation of a DC-Feeding Bridge 58 according to the teachings of the present invention and includes three sections 60, 62, 64. Further an example of an implementation of a DC-Holding Circuit 66 according to the teachings of the present invention having three sections 68, 70, 72. Instead of using coils to achieve high AC-impedances, the desired impedances are introduced by using transformer coupled impedance.

It is possible to vary the number of modules in series when implementing a DC-Feeding Bridge or a DC-Holding Circuit depending on the required performance. The number of modules in series may be one or more.

There are at least two ways of implementing each section (see FIG. 4), namely by using two separate transformers, such as illustrated by the sections 63A and 63B, or one transformer with 3 windings as illustrated by section 60 and 68.

The section 60 comprises three coils and a resistor mounted in parallel with one coil. The section may be construed as a section having two modules, where the middle coil and the resistor are construed as being part of both modules. The first module in section 60 comprises coil 61A, coil 61B and resistor 61C. The second module comprises coil 61B, resistor 61C and coil 61D. Thereby two transformers are established with the use of three coils and one resistor.

The section 62 comprises two modules 63A and 63B, each module 63A and 63B comprising two coils forming a transformer and a resistor.

The teachings of the present invention allow a person designing a circuit for a test apparatus to combine one or more of the above mentioned sections to achieve or fulfill a given requirement or specification.

It is up to the person designing the circuit or system to achieve the most suitable choice of component characteristics depending on performance requirements. In relation to FIG. 8 an example of an embodiment is given, along with examples of component values or characteristics.

Depending on desired performance or requirements for a specific section in the DC-Feeding Bridge 58 or the DC-Holding Circuit 66, bifilar winding for the transformers could be used. Also, regarding the transformers with three windings the two windings carrying the DC-current could be bifilar wound.

Matching of transformers (such as TR2 and TR2' in section 62) is one possible way to improve performance and/or characteristics.

The three-section DC-Feeding Bridge 58 is connected to a pair of transmission lines 74 and 76.

A computer simulation of the above discussed circuits has been implemented and the setup and results are shown in FIGS. 5-9. The simulation is discussed below.

Figure 5:
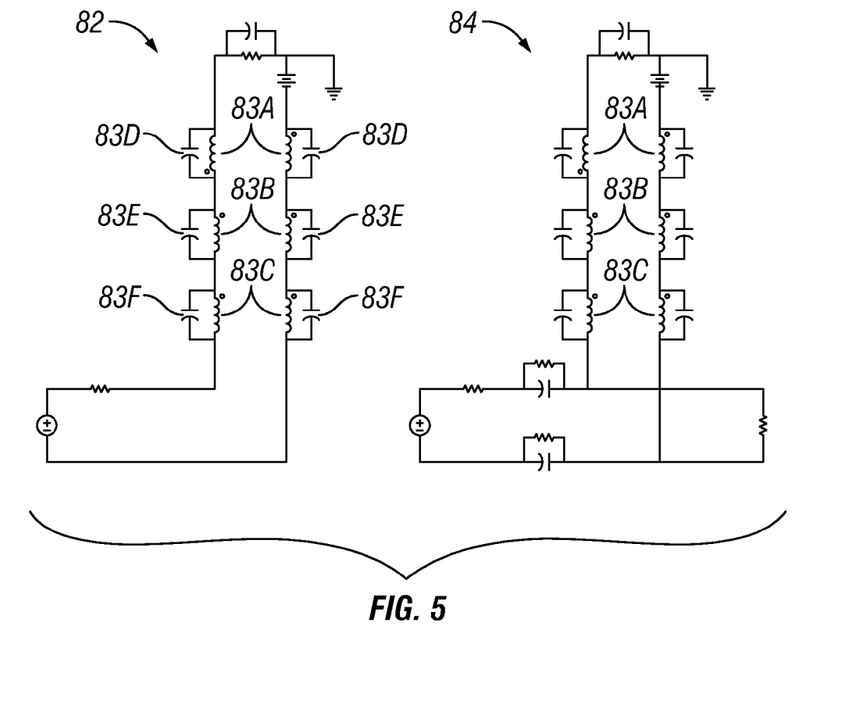
FIG. 5 is a schematic illustration of two circuits.

FIG. 5 is a schematic illustration of two circuits 82 and 84. The circuits in FIG. 5 are used to simulate real circuits. The components in the simulation are ideal meaning that e.g. in order to simulate a real transformer an inductor is placed in parallel with a capacitor etc.

As an illustration of the possible resonances, which often occur when using inductors in series, only winding capacitance related to the inductors are added—otherwise everything is still ideal.

The circuit 82 is used to simulate the AC input impedance of a DC-Feeding Bridge as function of frequency. For the simulation the following component characteristics are used:
Coils 83A having an inductance of 50 mH,
Coils 83B having an inductance of 5 mH,
Coils 83C having an inductance of 200 uH,
Capacitors 83D having a capacitance of 1.5 nF,
Capacitors 83E having a capacitance of 100 pF,
Capacitors 83F having a capacitance of 2 pF.

Figure 6:
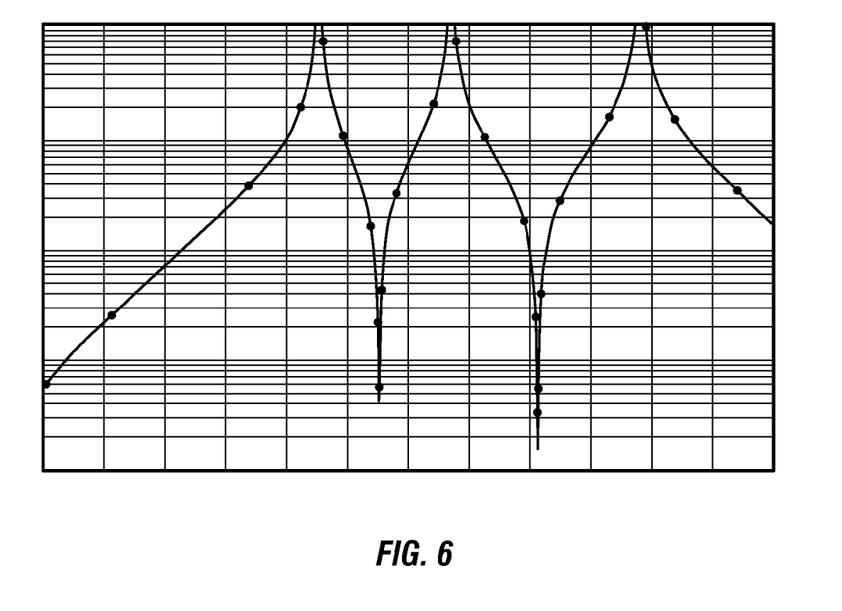
FIG. 6 is a schematic diagram illustrating magnitude of AC input impedance as a function of frequency.

The above is merely one example of an embodiment and is used as a basis for a simulation, the result of which is shown in FIG. 6. Components with similar value or characteristics are given the same reference numeral in the figure.

The circuit 84 in the right part of FIG. 5 is used to simulate a frequency response to indicate in a very simply way what could happen with the frequency response when the DC-Feeding Bridge is acting as a non-linear load.

The circuit 82 and the circuit 84 both comprise coils of three different values, namely 50 mH, 5 mH and 200 uH. The coils are paired so that two adjoining coils have the same characteristics. The capacitors are paired in the same manner. The capacitors have the values 1.5 nF, 100 pF and 2 pF.

The magnitude of the impedance as function of the frequency is shown in FIG. 6. The impedance of the simulated DC-Feeding Bridge is significant related to the AC-impedance level used in xDSL broadband systems. The used xDSL AC-impedance level is app. 100 ohm.

At two different frequency intervals in the used broadband bandwidth the impedance is quite below the recommended minimum level at 5000 j ohm and also below 1000 ohm (10 times used AC-impedance level) which may be a satisfactory level for some xDSL measurements.

FIG. 6 is a schematic diagram illustrating the magnitude of the AC input impedance calculated as a function of frequency. FIG. 6 is related to the circuits in FIG. 5. The y-axis is measured in ohm.

Figure 7:
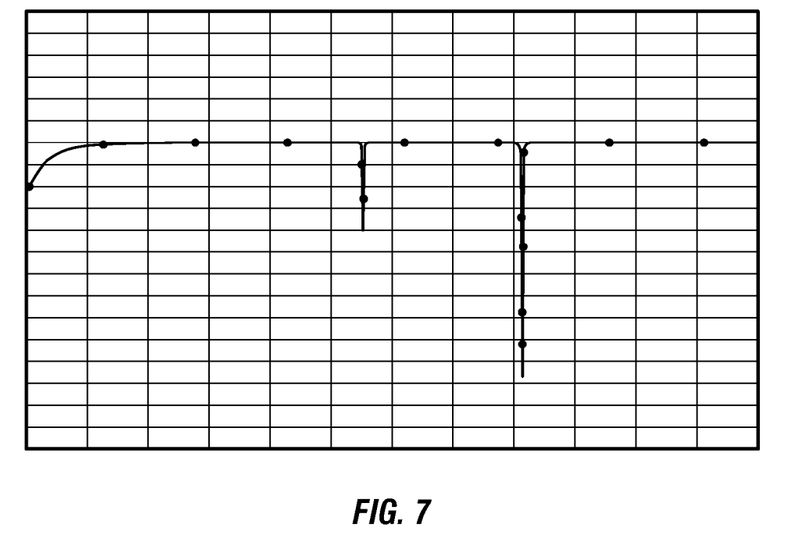
FIG. 7 is a schematic illustration of non-linear load effect on the frequency response.

A schematic view at how the non-linear load affect on the frequency response is given in FIG. 7.

FIG. 7 is a schematic diagram illustrating the amplitude frequency response. FIG. 7 is related to the circuits in FIG. 5. The y-axis is measured in dB. As may be seen from FIG. 7 the frequency response includes to minima, which is undesirable as it at least makes testing at those frequencies difficult.

From the above is may be appreciated that one advantage of the circuit and test apparatus according to the teachings of the present invention is that it is possible to realize relative simple broadband (100 Hz to 30 MHz) DC-Feeding Bridge and DC-Holding Circuit without undesirable resonances. The term "relative simple" covers both design (calculation and simulation) and realizing (prototyping), but also that it is feasible to implement a broadband DC-Feeding Bridge and DC-Holding Circuit. Circuit designs are exemplified by the schematic illustration shown in FIG. 4

During validation test and production test, a broadband DC-Feeding Bridge and DC-Holding Circuit is contemplated to provide at least the following advantages: Make it possible to carry out and validate each xDSL frequency band sweep requirements in one measurement. By this number of tests decrease dramatically and test time is contemplated to be significantly reduced. Further handling test reports and review of test reports is contemplated to be more simple and manageable. Still further the probability of making mistakes during measurements decreases, i.e. the quality of the test increases.

Other advantages include a simpler test setup i.e. only one DC-Feeding Bridge and DC-Holding Circuit used for both POTS and broadband measurements and a much simpler test system for automatic test and test may be performed on all DSL types using the test system according to the teachings of the present invention.

Overall the apparatus and circuit according to the present invention is contemplated to provide less time used during validation test of e.g. a VDSL2 splitter and cheaper test systems for validation tests and production tests.

Figure 8:
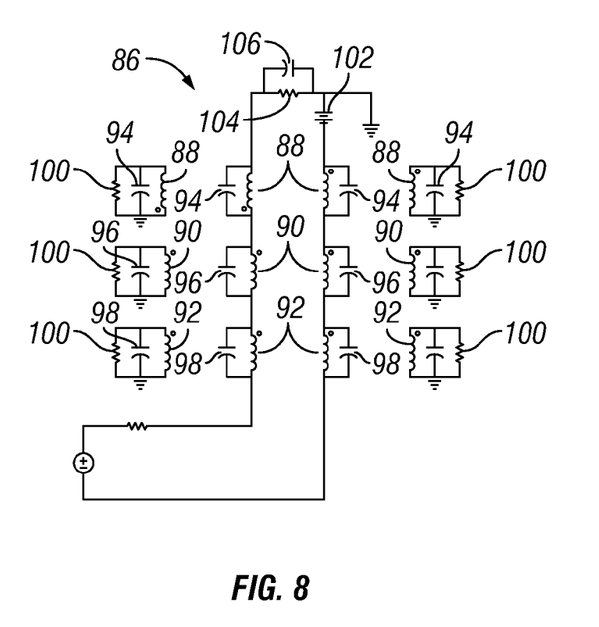
FIG. 8 is a schematic illustration of a DC-Feeding bridge.

FIG. 8 schematically illustrates a DC-Feeding Bridge 86 realized by use of coils. The circuit in FIG. 8 is used to simulate a real circuit. The components in the simulation are ideal meaning that in order to simulate a real transformer an inductor is placed in parallel with a capacitor. The bridge 86 is an alternative implementation of the circuit 82 shown in the left part of FIG. 5 and is realized according to the teachings of the present invention by using transformer coupled impedances.

The example shown in FIG. 8 of a bridge 86 is implemented using the following components:

Coil 88 having an inductance of 50 mH.
Coil 90 having an inductance of 5 mH.
Coil 92 having an inductance of 200 uH.
Capacitor 94 having a capacitance of 1.5 nF.
Capacitor 96 having a capacitance of 100 pF.
Capacitor 98 having a capacitance of 2 pF.
Resistor 100 having a variable resistance, but is fixed at 1.5 kΩ for the calculation of the simulations shown in FIG. 9.
A DC power source 102 providing a voltage of 48 Vdc.
A resistor 104 having a resistance of 500 ohm.
A capacitor 106 having a capacitance of 100 uF.

Figure 9:
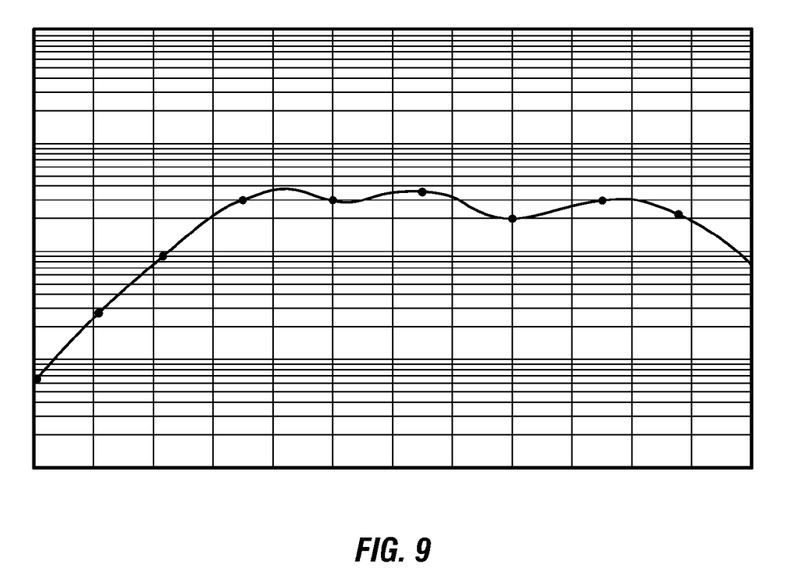
FIG. 9 is a schematic illustration of magnitude relative to AC input impedance.

Components with similar value or characteristics are given the same reference numeral in the figure. The bridge 86 is further used as a basis for the simulation result shown in FIG. 9. FIG. 9 is a schematic illustration showing the magnitude of the AC input impedance and relate to the diagram shown in FIG. 8. Compared to the magnitude of the AC input impedance shown in FIG. 6 the AC input impedance in FIG. 9 is more smooth, and do not include sharp minima, dips or sharp transitions.

The magnitude of the impedance for the DC-Feeding Bridge 86 realized by using transformer coupled impedances is illustrated in FIG. 9. Compared with the result for the coil solution in FIG. 6 the resonances are damped off.

Figure 10:
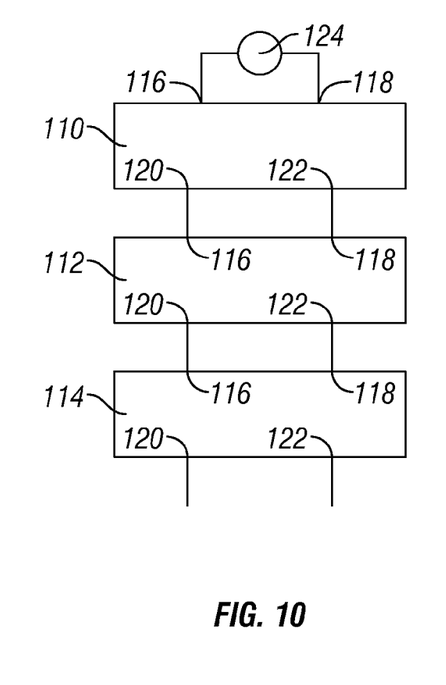
FIG. 10 is a schematic illustration of a part of a test apparatus having three circuit modules.

FIG. 10 is a schematic illustration of a part of a test apparatus having three circuits 110, 112, 114. Each of the circuits includes two inputs 116 and 118 and two outputs 120 and 122. The circuits 110, 112 and 114 are connected in series, meaning that the output of one circuit is connected to the input of the next circuit. A power source 124 is connected to the inputs of the first circuit 110.

Figure 11:
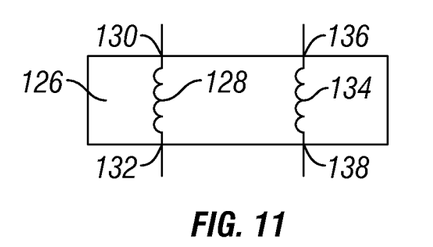
FIG. 11 is a schematic illustration of a module of a circuit having two inductors.

FIG. 11 schematically illustrates a circuit 126. Electrical connection is established between the first input connector 130 to the first output connector 132 via a first inductor 128. Further an electrical connection is established between the second input connector 136 to the second output connector 138 via a second inductor 134.

Figure 12:
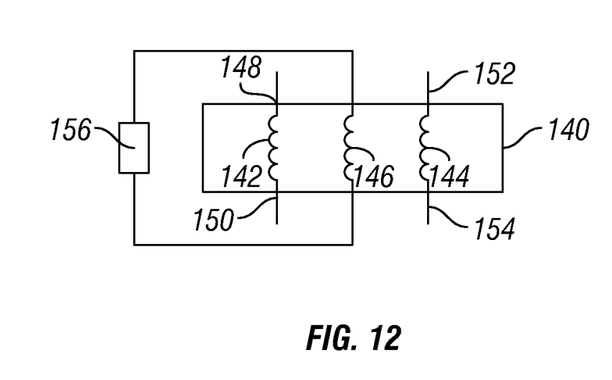
FIG. 12 is a schematic illustration of a module of a circuit having three inductors.

FIG. 12 schematically illustrates a second circuit 140 having three inductors 142, 144, 146. Electrical connection is established between the first input connector 148 to the first output connector 150 via the first inductor 142. Further an electrical connection is established between the second input connector 152 to the second output connector 154 via a second inductor 144. An impedance 156 is transformer coupled to the first inductor 142 via the third inductor 146 and the impedance 156 is also transformer coupled to the second inductor 144.

A test apparatus may according to the present invention comprise a single circuit such as the circuit 140. In other embodiments the test apparatus may comprise multiple circuits.

Figure 13:
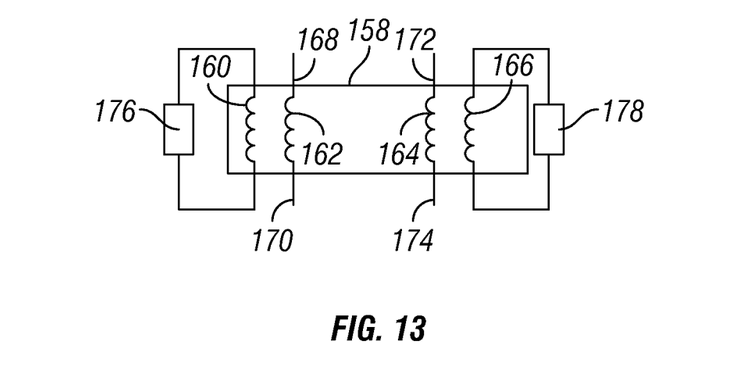
FIG. 13 is a schematic illustration of a module of a circuit having four inductors.

FIG. 13 schematically illustrates a third circuit 158 having four inductors 160, 161, 164 and 166. Electrical connection is established between the first input connector 168 to the first output connector 170 via the first inductor 162. Further an electrical connection is established between the second input connector 172 to the second output connector 174 via a second inductor 164. A first impedance 176 is transformer coupled to the first inductor 162 via the third inductor 160. A second impedance 178 is transformer coupled to the second inductor 164 via the fourth inductor 178.

A test apparatus may according to the present invention comprise a single circuit such as the circuit 158. In other embodiments the test apparatus may comprise multiple circuits. Advantageous embodiments of the present invention may comprise multiple circuits and may include a mix of circuit types, such as illustrated in FIG. 4.

The elements labeled as first, second etc. is to be considered as examples. The present invention may encompass embodiments where a number of modules or circuits, such as the examples shown in FIGS. 11-13, are assembled. Therefore, the mentioning of the first circuit input 130 may as well be a third, fifth or even higher numbered input. The same observations also apply to the remaining elements.

The invention claimed is:

1. A test apparatus for a broadband telecommunication network, comprising:
   a DC power source having a first electrical terminal and a second electrical terminal; and
   a DC feeding bridge having a pair of inputs coupled to the first and second electrical terminals of the DC power source, the DC feeding bridge further comprising:
     a first circuit section having a first transformer-coupled impedance comprising at least one transformer connected in parallel to a first impedance;
     a second circuit section having a second transformer-coupled impedance comprising at least one transformer connected in parallel to a second impedance;
     a third circuit section having a third transformer-coupled impedance comprising at least one transformer connected in parallel to a third impedance,
     wherein primary windings of each of the at least one transformers are coupled together in series; and
     a pair of outputs provided with the third circuit section that are adapted for establishing electrical contact with a device under test (DUT) configured to be disposed on a pair of transmission lines of the broadband telecommunication network.

2. The test apparatus according to claim 1, wherein the first impedance, the second impedance, and the third impedance each comprises one of a resistor, a variable resistor, a capacitor, and an inductor.

3. The test apparatus according to claim 1, wherein the at least one transformer of the first circuit section of the DC feeding bridge comprises three windings, wherein the first impedance is coupled in parallel to one of the three windings.

4. The test apparatus according to claim 1, wherein the test apparatus operates in the frequency range 100 Hz to 30 MHz.

5. The test apparatus according to claim 1, wherein the at least one transformer of the first circuit section comprises one of a transformer with an air core and a transformer with an iron core, having a bifilar winding arrangement.

6. The test apparatus according to claim 1 further comprising:
   a DC holding circuit comprising a pair of outputs coupled to the pair of transmission lines of the broadband telecommunication network on the other side of the DUT, the DC holding circuit further comprising:
      a first circuit section having a first transformer-coupled impedance comprising at least one transformer connected in parallel to a first impedance;
      a second circuit section having a second transformer-coupled impedance comprising at least one transformer connected in parallel to a second impedance;
      a third circuit section having a third transformer-coupled impedance comprising at least one transformer connected in parallel to a third impedance,
      wherein primary windings of each of the at least one transformers are coupled together in series and further wherein the third circuit section of the DC holding circuit is configured to provide the pair of outputs for the DC holding circuit.

7. The test apparatus according to claim 6, wherein the at least one transformer of the first circuit section of the DC holding circuit comprises three windings, wherein the first impedance is coupled in parallel to one of the three windings.

8. The test apparatus according to claim 6, wherein the at least one transformer of the second circuit section of the DC holding circuit comprises three windings, wherein the second impedance is coupled in parallel to one of the three windings.

9. The test apparatus according to claim 6, wherein the at least one transformer of the third circuit section of the DC holding circuit comprises three windings, wherein the third impedance is coupled in parallel to one of the three windings.

10. The test apparatus according to claim 1, wherein the at least one transformer of the second circuit section of the DC feeding bridge comprises three windings, wherein the second impedance is coupled in parallel to one of the three windings.

11. The test apparatus according to claim 1, wherein the at least one transformer of the third circuit section of the DC feeding bridge comprises three windings, wherein the third impedance is coupled in parallel to one of the three windings.

\* \* \* \* \*